J. F. PALMER.
PROCESS OF IMPREGNATING FIBROUS MATERIALS.
APPLICATION FILED APR. 17, 1917.
1,328,541.
Patented Jan. 20, 1920.
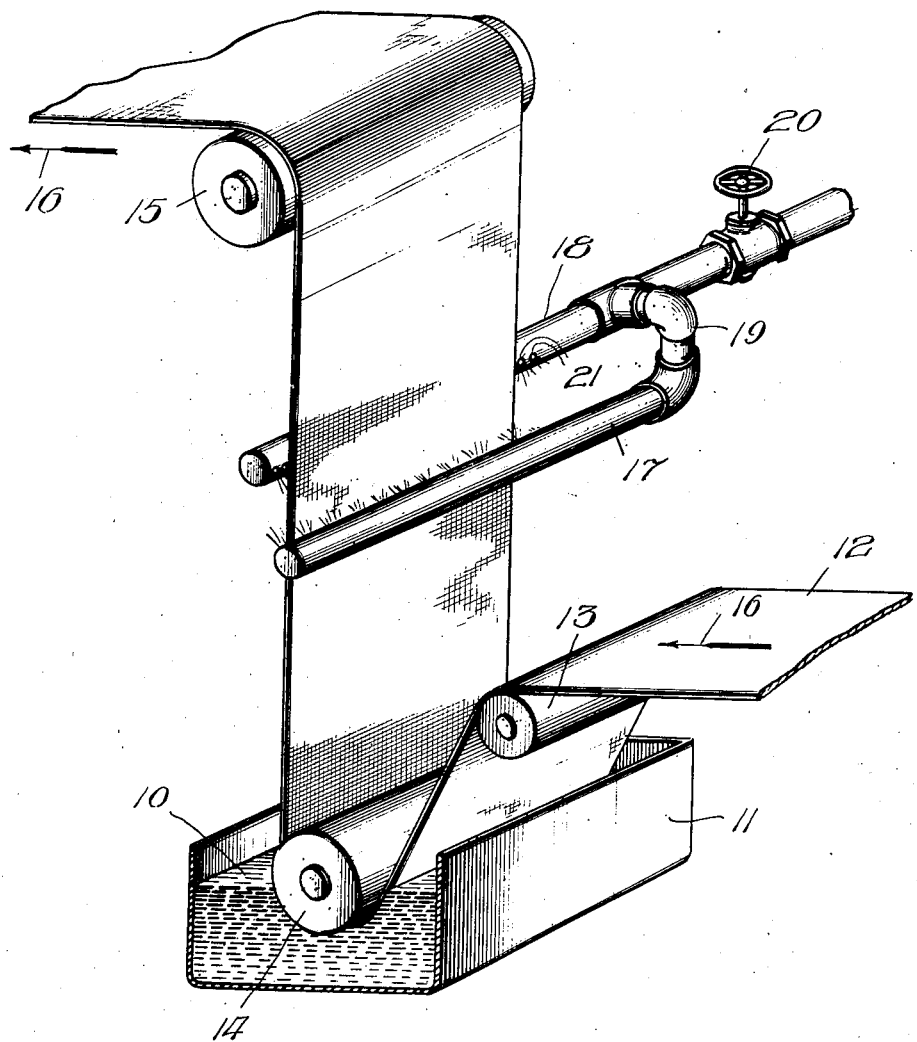

UNITED STATES PATENT OFFICE.

JOHN F. PALMER, OF ST. JOSEPH, MICHIGAN.

PROCESS OF IMPREGNATING FIBROUS MATERIALS.

1,328,541. Specification of Letters Patent. Patented Jan. 20, 1920.

Application filed April 17, 1917. Serial No. 162,662.

*To all whom it may concern:*

Be it known that I, JOHN F. PALMER, a citizen of the United States, residing at St. Joseph, in the county of Berrien and State of Michigan, have invented certain new and useful Improvements in Processes of Impregnating Fibrous Materials, of which the following is a specification.

My invention relates in general to processes of impregnating woven or textile fabrics, generally called "frictioning", and more particularly thoroughly impregnating cords, or fabrics, with a solution of rubber for use in the making of pneumatic tires.

In the manufacture of rubber articles, such, for instance, as pneumatic tires, in which thread, cord, or woven fabric are used as a means of strengthening or restraining movement in the naturally elastic body of the rubber itself, considerable difficulty has been encountered in securing the desired intimate and certain union between the fibrous reinforcing material and the rubber. The most common practice in the frictioning treatment of the reinforcing thread, cord, or other fabric, in preparation for its use in the manufacture of rubber articles, is to subject the reinforcing material to a process in which a film of softened rubber is applied to the surface of the fabric or threads by means of heat and high pressure produced by calender rolls. The rolls, when run at differential speeds, cause a resulting grinding action that forces the softened rubber into the interstices of the fabric with maximum efficiency, but set up a disturbance of the relative positions of the fibrous members that form such fabric, more particularly if the fibers are loosely associated. If the rolls are run at equal speeds the rubber is inadequately forced between and around the fibers forming the threads and the threads composing the fabric.

An analogous process heretofore used in the case of fragile fabrics, or where it is inconvenient or dangerous to subject the fabric to the strain of the above-described process, is to use a spreading machine in which rubber in solution of varying consistency—usually like a thick paste—is scraped by a knife over the surface of the fabric and forced into the interstices thereof.

It is also the practice in subjecting thread, or an association of threads, to a rubber treatment to pull such threads through a die into a chamber containing rubber in solution under high pressure, perhaps one hundred or two hundred pounds per square inch, and then out again through another die at the other end of the chamber, the latter die acting somewhat as a knife or spatula in scraping off the surplus rubber and making uniform the application thereof to the thread.

In all of the above-mentioned processes of treating thread, cord, or fabric, with rubber, the application of the rubber, either by the calender rolls, the spreading machine, or the die, is continuously in the direction of the length of the thread, cord, or fabric, as it is moved through the treating machine, which results in the innumerable free ends of the fibers that project from the surface of the thread, &c., being smoothed down upon the main body of the thread, cord, or fabric, in such manner that the free ends of the individual projecting superficial fibers are not impregnated with rubber, but are pressed against the surface of the thread, cord, or fabric, without the intervention of any of the rubber coating. Furthermore, this forcing of the free superficial ends of the fibers against the main body of the thread, cord, or fabric, tends to prevent the rubber from impregnating the main body of the article to be treated, so that when the article is subsequently vulcanized the adhesion or "frictioning" quality between the rubber and the fabric article is impaired, owing to the adhesion depending upon the intimacy and completeness of the application of the rubber to the individual fibers; all of which will be understood and appreciated by those skilled in the art.

The object of my invention is to provide a simple, efficient, and economical process for thoroughly impregnating fibrous articles, by the practice of which the objections above referred to as present in the operation of machines heretofore used for this purpose are avoided, and which will produce a satisfactory as well as practical commercial article.

A further object of my invention is to provide a process of thoroughly impregnating loosely associated fibrous materials by the practice of which the solutioned rubber will penetrate and thoroughly impregnate the fibers or threads of which the article is formed, and at the same time the said solutioned rubber will individually treat the loose ends of the fibers projecting from the surface of the article.

My improvement consists principally in a process for frictioning fibrous materials by the use of a current of air under pressure, in which the rubber solution is driven into and through the fibers or threads which compose the fabric.

Any suitable device or apparatus capable of furnishing a current of air under pressure to drive or force the rubber solution into the fabric may be employed in the practice of my process, the essential feature of which is that the individual threads which compose the article may be thoroughly impregnated with the rubber solution without being subjected to any pressure or strain which would tend to distort them, or cause the free fiber ends on the surface thereof to be pressed against the body of the article being first treated.

My invention also contemplates the use of one or more devices to furnish the necessary current of air under pressure, located in various positions with respect to the fabric to be treated, so that as the fabric passes relatively to the air currents under pressure, or vice versa, all portions thereof will be thoroughly impregnated with the softened rubber.

One form of apparatus which may be used for impregnating the fibrous material is illustrated in the drawings in which the rubber solution 10 is contained in a relatively flat vessel 11. The long strip or sheet of fibrous material 12 is passed over a roller 13 above one edge of the vessel and then around the underside of another roller 14, which is partially immersed in the rubber solution. The sheet 12 is then carried in a vertical direction and over another roller 15 from which it is extended horizontally and caused to move in the direction indicated by the arrows 16. A pair of perforated pipes 17 and 18 are located on opposite sides of the sheet 12 between the rollers 14 and 15, and these pipes are connected to a common supply pipe 19 having a valve 20 therein for controlling the flow of compressed air through the pipes. The pipes 17 and 18 are located in different horizontal planes with their perforations 21 directed toward the sheet 12, so that a number of fine currents of air under pressure are directed onto the sheet 12 after the latter has passed through the vessel 11 and received a coating of the rubber solution. The fine curents of air in the pipe 17 force the rubber solution through the fibrous material and completely impregnate every particle thereof with the rubber solution. The material then passes opposite the pipe 18 which is located on the other side thereof and the rubber solution is forced back in the opposite direction through the sheet, thus securing a substantially perfect impregnation of the material. An air pressure of from five to fifty points is preferably employed, depending upon the materials used and surrounding conditions.

If desired, after the thread, fabric, or other fibrous article, has been treated by my improved process, so as to be impregnated with a priming coat, it may then be treated by any of the processes, such as calender rolls, or spreading machines, to add further amounts of softened rubber; or the fabric may be re-treated several times by the use of the air current to impregnate it with successive solutions of rubber, as may seem desirable or necessary.

My improved process may be practised upon the materials to be treated at any time most convenient, from the spinning of the thread through all of the subsequent processes through which the thread passes to its final use, either as a fabric or a manufactured article comprising such fabric.

My improved process may be advantageously used in impregnating braided fabrics, or fabrics which have been cut on the bias, or tubular fabrics, inasmuch as the present methods of impregnating said fabrics subjects braided or bias-cut fabrics to such a strain as to distort them, and cannot be effectively practised in connection with tubular or cylindrical fabrics. My improved process, as it does not subject the fabric to strain, will not distort braided or bias-cut fabrics, and will effectually impregnate all portions of a tubular or cylindrical fabric.

While my improved invention is particularly adapted for use in "frictioning" fibrous materials, such as cord, thread, or fabrics, preparatory to using them to reinforce pneumatic tire casings, yet it may be advantageously practised with other fabrics, such, for instance, as those which it is desired to render waterproof. It frequently happens that it is desired to impregnate a fabric which is so thin, gauzy, or fragile as to be easily distorted by the processes heretofore practised. In such instances my improved process is of peculiar advantage, as each individual thread receives its proper treatment, and, if desired, the air blast which conveys the finely divided particles of the solutioned rubber to the article being treated may subsequently clear the open spaces between the threads or fibers of any surplus rubber, thus retaining the open structure of the article—which it sometimes is very desirable to retain—after it has been treated and its fibrous structure thereby insulated, or rendered waterproof.

In some instances it may prove desirable to first subject the material to be treated in any way to the substance in solution, as by dipping the articles in the solution and then subjecting them to the current of air under pressure, which will act to drive the solution through the interstices of the material, and leave it in the desired condition with passages between the cords or threads.

I claim:—

1. The process of frictioning a fibrous material which consists in subjecting said material to a coating of rubber in solution and then driving the rubber substance into and through said material by means of a concentrated current of air under pressure.

2. The process of frictioning fibrous or woven materials which consists in applying rubber in solution to the surface of said materials and effecting a puddling action between the projecting fibers of the material by means of a concentrated current of air under pressure, whereby the projecting fibers are stirred about in the solution and are thoroughly coated and impregnated with the solution.

3. The process of frictioning fibrous or woven materials which consists in applying rubber in solution to the surface thereof and driving said solution through said materials and back again by means of concentrated currents of air under pressure.

In testimony whereof, I have subscribed my name.

JOHN F. PALMER.